US012689016B2

(12) United States Patent
Ueda et al.

(10) Patent No.: US 12,689,016 B2
(45) Date of Patent: Jul. 21, 2026

(54) METHOD FOR MASS SPECTROMETRY AND MASS SPECTROMETER

(71) Applicant: SHIMADZU CORPORATION, Kyoto (JP)

(72) Inventors: Hiroko Ueda, Kyoto (JP); Yusuke Tateishi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 313 days.

(21) Appl. No.: 18/635,947

(22) Filed: Apr. 15, 2024

(65) Prior Publication Data

US 2024/0355609 A1 Oct. 24, 2024

(30) Foreign Application Priority Data

Apr. 18, 2023 (JP) ................................ 2023-067673

(51) Int. Cl.
*H01J 49/40* (2006.01)
*H01J 49/00* (2006.01)

(52) U.S. Cl.
CPC .......... *H01J 49/40* (2013.01); *H01J 49/0036* (2013.01); *H01J 49/0009* (2013.01)

(58) Field of Classification Search
CPC ............... H01J 49/0009; H01J 49/0027; H01J 49/0031; H01J 49/0036; H01J 49/40
See application file for complete search history.

(56) References Cited

U.S. PATENT DOCUMENTS

| | | | | |
|---|---|---|---|---|
| 10,401,337 | B2 * | 9/2019 | Zubarev | H01J 49/0036 |
| 2011/0282587 | A1 * | 11/2011 | Jones | G06F 17/10 702/22 |
| 2020/0152434 | A1 * | 5/2020 | Yamamoto | H01J 49/004 |
| 2021/0202223 | A1 * | 7/2021 | Oshikawa | H01J 49/0036 |

(Continued)

FOREIGN PATENT DOCUMENTS

| | | | |
|---|---|---|---|
| WO | 2019/220501 | A1 | 11/2019 |
| WO | 2021/131140 | A1 | 7/2021 |

OTHER PUBLICATIONS

Noam Kirshenbaum, Izhak Michaelevski, and Michal Sharon, "Analyzing Large Protein Complexes by Structural Mass Spectroscopy", J Vis. Exp., Jun. 1, 20109, (40), 1954.

*Primary Examiner* — David E Smith
(74) *Attorney, Agent, or Firm* — Muir Patent Law, PLLC

(57) ABSTRACT

A plurality of partial mass-to-charge-ratio ranges are defined so that neighboring partial mass-to-charge-ratio ranges overlap each other at a mass-to-charge ratio of a reference ion (Step 2). Mass spectrometry data of a known compound is acquired in each partial mass-to-charge-ratio range (Steps 3 and 4). A normalization coefficient is determined based on a measured intensity of the reference ion in the mass spectrometry data acquired in each of the neighboring partial mass-to-charge-ratio ranges (Steps 6 and 9). Mass spectrometry data of a measurement-target sample is acquired in each partial mass-to-charge-ratio range (Step 12). The mass spectrometry data of the measurement-target sample acquired in each partial mass-to-charge-ratio range is normalized by being multiplied by the corresponding normalization coefficient (Step 14). The normalized mass spectrometry data of the plurality of partial mass-to-charge-ratio ranges is integrated into one set of mass spectrometry data (Step 15).

9 Claims, 7 Drawing Sheets

(56) References Cited

U.S. PATENT DOCUMENTS

| | | | | |
|---|---|---|---|---|
| 2021/0242008 | A1 | 8/2021 | Oshiro et al. | |
| 2022/0285143 | A1 | 9/2022 | Ueno et al. | |
| 2023/0236159 | A1* | 7/2023 | Matsuo | G01N 30/8675 250/282 |
| 2024/0063006 | A1* | 2/2024 | Thöing | H01J 49/0031 |

* cited by examiner

Fig. 3

| (CsI)n | $(CsI)nCs^+$ |
|---|---|
| 1 | 392.7154 |
| 2 | 652.5253 |
| 3 | 912.3352 |
| 4 | 1172.145 |
| 5 | 1431.955 |
| 6 | 1691.765 |
| 7 | 1951.575 |
| 8 | 2211.385 |
| 9 | 2471.195 |
| 10 | 2731.005 |
| 11 | 2990.815 |
| 12 | 3250.625 |
| 13 | 3510.434 |
| 14 | 3770.244 |
| 15 | 4030.054 |
| 16 | 4289.864 |
| 17 | 4549.674 |
| 18 | 4809.484 |
| 19 | 5069.294 |
| 20 | 5329.104 |
| 21 | 5588.914 |
| 22 | 5848.724 |
| 23 | 6108.534 |
| 24 | 6368.344 |
| 25 | 6628.154 |

| (CsI)n | $(CsI)nCs^+$ |
|---|---|
| 26 | 6887.964 |
| 27 | 7147.773 |
| 28 | 7407.583 |
| 29 | 7667.393 |
| 30 | 7927.203 |
| 31 | 8187.013 |
| 32 | 8446.823 |
| 33 | 8706.633 |
| 34 | 8966.443 |
| 35 | 9226.253 |
| 36 | 9486.063 |
| 37 | 9745.873 |
| 38 | 10005.68 |
| 39 | 10265.49 |
| 40 | 10525.3 |
| 41 | 10785.11 |
| 42 | 11044.92 |
| 43 | 11304.73 |
| 44 | 11564.54 |
| 45 | 11824.35 |
| 46 | 12084.16 |
| 47 | 12343.97 |
| 48 | 12603.78 |
| 49 | 12863.59 |
| 50 | 13123.4 |

| (CsI)n | (CsI)nCs⁺ |
|---|---|
| 1 | 392.7154 |
| 2 | 652.5253 |
| 3 | 912.3352 |
| 4 | 1172.145 |
| 5 | 1431.955 |
| 6 | 1691.765 |
| ... | ... |
| 13 | 3510.434 |
| 14 | 3770.244 |
| 15 | 4030.054 |
| ... | ... |
| 41 | 10785.11 |

METHOD FOR MASS SPECTROMETRY AND MASS SPECTROMETER

TECHNICAL FIELD

The present invention relates to a method for mass spectrometry and a mass spectrometer.

BACKGROUND ART

In a time-of-flight mass spectrometer (TOF-MS), ions originating from a sample component are introduced into a time-of-flight mass separator, which gives the ions a specific amount of kinetic energy and injects them into a drift space, in which the ions are made to fly in a path of a predetermined length and individually detected by an ion detector. Within the drift space, an ion having a smaller mass-to-charge ratio flies faster and hits the ion detector in a shorter period of time. Accordingly, a mass spectrum can be obtained by creating a graph with the horizontal axis indicating the time of flight and the vertical axis indicating the intensity of ions, and subsequently converting the time of flight into the mass-to-charge ratio based on previously provided information. In a time-of-flight mass spectrometer, for example, a quadrupole electrode (QP) or ion trap (IT) is provided in front of the time-of-flight mass spectrometry unit. The quadrupole electrode transports ions to the time-of-flight mass separator. The ion trap accumulates ions and simultaneously ejects them into the drift space (see Patent Literatures 1 and 2).

A time-of-flight mass spectrometer can perform a measurement of ions over a wide range of mass-to-charge ratios (m/z), e.g., within a range of m/z=500-20,000. However, there is a limit on the mass-to-charge-ratio range of the ions which can be accumulated within an ion trap. There is also a limit on the mass-to-charge-ratio range of the ions which can be transported by a quadrupole electrode. Furthermore, the memory capacity of a digitizer used for the digital conversion of the output signals of the ion detector is also limited, making it impossible to hold a huge amount of digitized data over a wide range of mass-to-charge ratios. For those reasons, it is impossible to perform a measurement over a wide range of mass-to-charge ratios at one time. Therefore, when mass spectrometry data must be acquired over a wide range of mass-to-charge ratios, it is necessary to divide a mass-to-charge-ratio range which is a measurement target into a plurality of segments, perform the measurement for each segment of the mass-to-charge-ratio range and integrate mass spectra separately obtained through the measurements.

CITATION LIST

Patent Literature

Patent Literature 1: WO2019/220501 A

Patent Literature 2: WO 2021/131140 A

Non Patent Literature

Non Patent Literature 1: Noam Kirshenbaum, Izhak Michaelevski, and Michal Sharon, "Analyzing Large Protein Complexes by Structural Mass Spectroscopy", *J Vis. Exp.,* 2010 Jun. 19, (40), 1954

SUMMARY OF INVENTION

Technical Problem

In the measurement performed for each segment of the mass-to-charge-ratio range, a different set of voltages are applied to the ion trap or quadrupole electrode for each segment of the mass-to-charge-ratio range so as to capture ions belonging to that segment or allow them to pass through. Since the measurement sensitivity for ions changes depending on the values of the voltages applied to the ion trap or quadrupole electrode, the measurement sensitivity varies depending on the segment of the mass-to-charge-ratio range, and therefore, simply integrating the mass spectra separately obtained for each segment of the mass-to-charge-ratio range cannot yield mass spectrometry data with a uniform measurement sensitivity as in the case of performing the measurement over the whole mass-to-charge-ratio range at one time.

The problem to be solved by the present invention is to provide a technique by which mass spectrometry data with a uniform measurement sensitivity can be obtained even by dividing a mass-to-charge-ratio range which is a measurement target into a plurality of segments, performing the measurement for each segment of the mass-to-charge-ratio range and integrating mass spectra separately obtained through the measurements.

Solution to Problem

One mode of the method for mass spectrometry according to the present invention developed for solving the previously described problem includes the steps of:

- defining a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;
- acquiring a set of mass spectrometry data by performing a mass spectrometric analysis of the known compound in each of the plurality of partial mass-to-charge-ratio ranges;
- determining a normalization coefficient for normalizing measured intensities of ions in each of the plurality of partial mass-to-charge-ratio ranges, based on the measured intensity of the reference ion in the mass spectrometry data acquired in each of the neighboring partial mass-to-charge-ratio ranges;
- acquiring a set of mass spectrometry data by performing a mass spectrometric analysis of a measurement-target sample in each of the plurality of partial mass-to-charge-ratio ranges;
- normalizing the mass spectrometry data of the measurement-target sample acquired in each of the plurality of partial mass-to-charge-ratio ranges, by multiplying the measured intensities of the ions in the mass spectrometry data by the normalization coefficient corresponding to the partial mass-to-charge-ratio range concerned; and
- integrating the normalized mass spectrometry data of the plurality of partial mass-to-charge-ratio ranges into one set of mass spectrometry data.

One mode of the mass spectrometer according to the present invention developed for solving the previously described problem includes:

a storage section in which a plurality of partial mass-to-charge-ratio ranges defined by dividing a whole mass-to-charge-ratio range which is a measurement target and a normalization coefficient in each of the plurality of partial mass-to-charge-ratio ranges are stored, where the plurality of partial mass-to-charge-ratio ranges are defined in such a manner that neighboring partial mass-to-charge-ratio ranges overlap each other at the mass-to-charge ratio of a predetermined reference ion generated from a known compound, while the normalization coefficient is determined based on the measured intensity of the reference ion in the mass spectrometry data acquired in each of the neighboring partial mass-to-charge-ratio ranges;

a measurement executer configured to acquire a set of mass spectrometry data by performing a mass spectrometric analysis of a measurement-target sample in each of the plurality of partial mass-to-charge-ratio ranges;

a data normalizer configured to normalize the mass spectrometry data of the measurement-target sample acquired in each of the plurality of partial mass-to-charge-ratio ranges, by multiplying measured intensities of ions in the mass spectrometry data by the normalization coefficient corresponding to the partial mass-to-charge-ratio range concerned; and a data integrator configured to integrate the normalized mass spectrometry data of the plurality of partial mass-to-charge-ratio ranges into one set of mass spectrometry data.

Another mode of the method for mass spectrometry according to the present invention developed for solving the previously described problem includes the steps of:

defining a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;

acquiring a set of mass spectrometry data by performing a mass spectrometric analysis of a measurement-target sample with the known compound added in each of the plurality of partial mass-to-charge-ratio ranges;

normalizing the mass spectrometry data of the measurement-target sample acquired in each of the plurality of partial mass-to-charge-ratio ranges, in such a manner that measured intensities of the reference ion in the sets of mass spectrometry data respectively acquired in the neighboring partial mass-to-charge-ratio ranges are equalized; and integrating the normalized mass spectrometry data of the plurality of partial mass-to-charge-ratio ranges into one set of mass spectrometry data.

Another mode of the mass spectrometer according to the present invention developed for solving the previously described problem includes:

a partial mass-to-charge-ratio range setter configured to define a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;

a measurement executer configured to acquire a set of mass spectrometry data by performing a mass spectrometric analysis of a measurement-target sample with the known compound added in each of the plurality of partial mass-to-charge-ratio ranges;

a data normalizer configured to normalize the mass spectrometry data of the measurement-target sample acquired in each of the plurality of partial mass-to-charge-ratio ranges, in such a manner that measured intensities of the reference ion in the sets of mass spectrometry data respectively acquired in the neighboring partial mass-to-charge-ratio ranges are equalized; and a data integrator configured to integrate the normalized mass spectrometry data of the plurality of partial mass-to-charge-ratio ranges into one set of mass spectrometry data.

Advantageous Effects of Invention

In the present invention, a plurality of partial mass-to-charge-ratio ranges are defined by dividing a whole mass-to-charge-ratio range which is a measurement target, in such a manner that neighboring partial mass-to-charge-ratio ranges overlap each other at the mass-to-charge ratio of a predetermined reference ion generated from a known compound. In the case where the mass spectrometric analysis to be executed is an MS analysis, the reference ion is an ion directly generated from the known compound. In the case of an MS/MS analysis, the reference ion is either an ion generated from the known compound, or an ion (product ion) generated by the dissociation of the aforementioned ion (precursor ion). When the number of partial mass-to-charge-ratio ranges is n, the number of reference ions is n-1 (where n is a positive integer). Accordingly, when the number of partial mass-to-charge-ratio ranges is two, only one reference ion will used, whereas a plurality of reference ions will be used when the number of partial mass-to-charge-ratio ranges is three or more. In each of the plurality of partial mass-to-charge ratios, a mass spectrometric analysis of the known compound or a measurement-target sample with the known compound added is performed to acquire a set of mass spectrometry data.

After the sets of mass spectrometry data corresponding to the partial mass-to-charge-ratio ranges have been acquired, a normalization coefficient is determined for each of the plurality of partial mass-to-charge-ratio ranges, based on the measured intensities of the reference ion in the neighboring partial mass-to-charge-ratio ranges. In the present invention, the sets of mass spectrometry data acquired for the plurality of partial mass-to-charge-ratio ranges are normalized so that the measured intensities of the reference ion commonly measured in the neighboring partial mass-to-charge-ratio ranges will be equalized, and the measurement sensitivity for the ions will be equalized. Therefore, a set of mass spectrometry data having a uniform measurement sensitivity over the whole mass-to-charge-ratio range which is a measurement target can be obtained by integrating the normalized mass spectrometry data corresponding to the plurality of partial mass-to-charge-ratio ranges.

BRIEF DESCRIPTION OF DRAWINGS

FIG. 3 shows the mass-to-charge ratios of the ions to be generated from cesium iodide which is the standard substance in the present embodiment.

DESCRIPTION OF EMBODIMENTS

An embodiment of the method for mass spectrometry and the mass spectrometer according to the present invention is hereinafter described with reference to the drawings.

Figure 1:
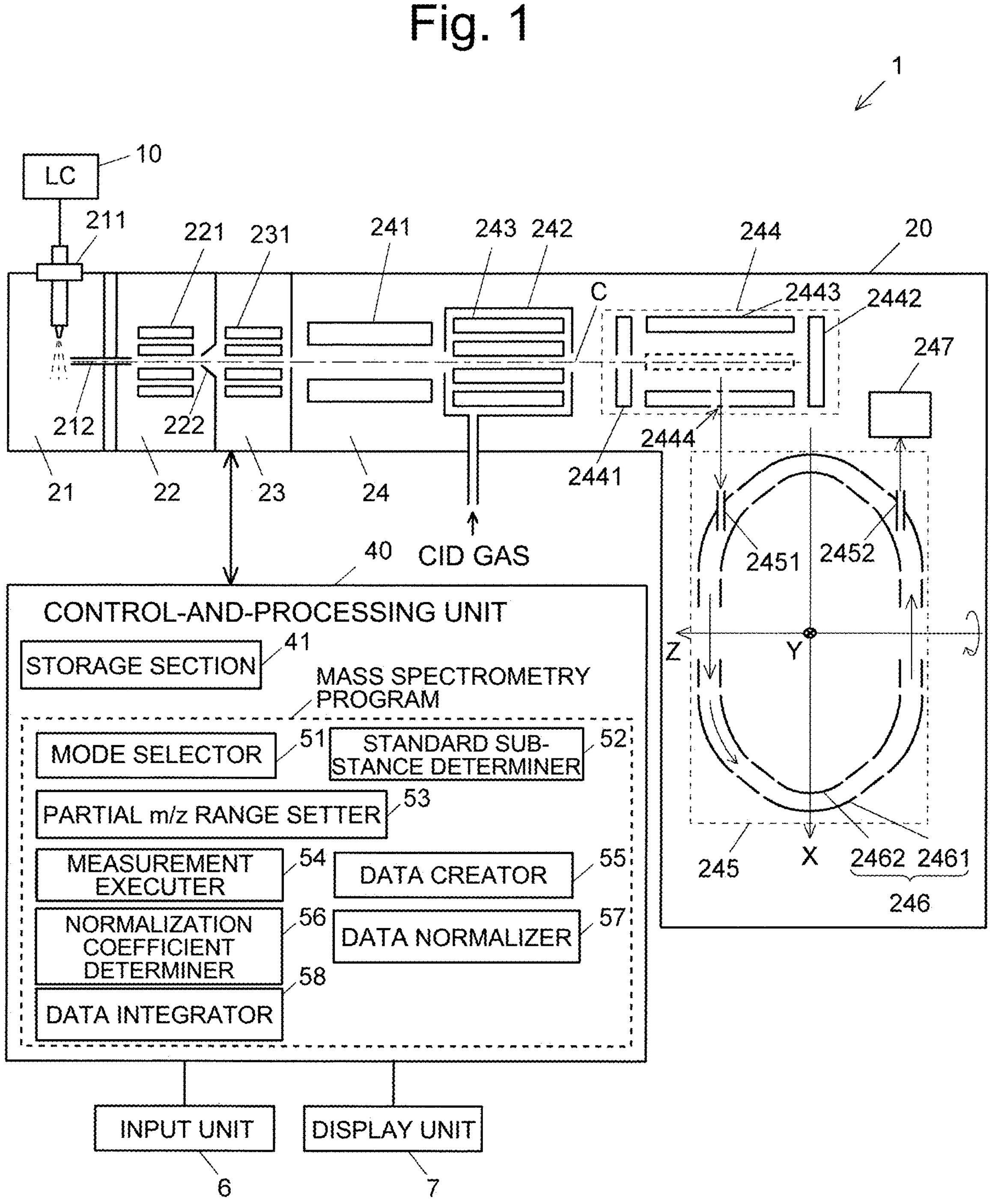
FIG. 1 is a configuration diagram of the main components of one embodiment of the mass spectrometer according to the present invention.

FIG. 1 shows the configuration of the main components of a liquid chromatograph mass spectrometer 1 in the present embodiment. The liquid chromatograph mass spectrometer 1 according to the present embodiment includes a liquid chromatograph (LC) 10, a mass spectrometer 20, and a control-and-processing unit 40 configured to control the operations of the aforementioned devices. In the liquid chromatograph 10, various components contained in a liquid sample are separated from each other by a column and introduced into an electrospray ionization (ESI) probe 211.

The inside of the mass spectrometer 20 is divided into compartments: an ionization chamber 21, a first intermediate vacuum chamber 22, a second intermediate vacuum chamber 23, and an analysis chamber 24. The ionization chamber 21 is at substantially atmospheric pressure, in which the electrospray ionization (ESI) probe 211 is located. The first intermediate vacuum chamber 22, second intermediate vacuum chamber 23 and analysis chamber 24 are located in a vacuum chamber, having the configuration of a multi-stage differential pumping system with the degrees of vacuum of those chambers gradually increased in the mentioned order.

A partition wall is provided between the ionization chamber 21 and the first intermediate vacuum chamber 22, with the two chambers communicating with each other through a desolvation tube 212 provided in the partition wall. The first intermediate vacuum chamber 22 is provided with an ion guide 221 configured to transport ions generated in the ionization chamber 21 to the subsequent stage along the ion axis C, i.e., the central axis of the direction of flight of the ions, while converging the ions.

The first intermediate vacuum chamber 22 communicates with the second intermediate vacuum chambers 23 through a small hole formed at the apex of a skimmer cone 222 separating the two chambers. The second intermediate vacuum chamber 23 is also provided with an ion guide 231 configured to receive ions coming from the first intermediate vacuum chamber 22 and transport them to the subsequent stage along the ion axis C while converging them.

The second intermediate vacuum chamber 23 communicates with the analysis chamber 24 through a hole formed in the partition wall. The analysis chamber is provided with a quadrupole electrode 241, collision cell 242, linear ion trap 244, multiturn time-of-flight mass separator 245 and ion detector 247. The quadrupole electrode 241 is configured to transport ions having mass-to-charge ratios within a measurement-target range along the ion beam axis C while converging them. The collision cell 242 contains a multipole ion guide 243. The collision cell 242 is supplied with inert gas at an appropriate timing from a collision-induced-dissociation (CID) gas source (not shown) located outside the vacuum chamber.

The linear ion trap 244 includes: a front-side electrode 2441 having an ion introduction opening formed on the ion beam axis C, a back-side electrode 2442, as well as four rod electrodes 2443 arranged around the ion beam axis C, with each rod electrode parallel to the same axis C. A slit 2444 for ejecting ions is formed in one of the four rod electrodes 2443.

The multiturn time-of-flight mass separator 245 is located outside the slit 2444. The multiturn time-of-flight mass separator 245 includes an ion introduction port 2451, loop-flight section 246 and ion ejection port 2452. The ion introduction port 2451 is arranged so as to oppose the slit 2444 of the rod electrodes 2443. The loop-flight section 246 has a substantially spheroidal outer electrode 2461 as well as a substantially spheroidal inner electrode 2462 located inside the outer electrode 2461. The diagram shown in FIG. 1 is a sectional view at the ZX plane containing the Z axis, which is the rotation axis in the substantial spheroids of the outer and inner electrodes 2461 and 2462, as well as the X axis, which is a one-directional axis perpendicular to the Z axis. Cutting the loop-flight section 246 at any plane containing the Z axis would reveal a substantially identical shape to the one shown in FIG. 1, regardless of the angle of orientation (the angle around the Z axis) of the section. The outer and inner electrodes 2461 and 2462 are formed by partial electrode pairs each consisting of a pair of mutually facing electrodes having a curved shape on the ZX plane, as well as partial electrode pairs each consisting of a pair of mutually facing electrodes having a linear shape on the ZX plane. The ion detector 247 is located outside the ion ejection port 2452.

The control-and-processing unit 40 includes a storage section 41. In this storage section 41, measurement conditions and data-analysis conditions related to various known compounds are stored. The information related to the known compounds also includes the retention time for standard substances which will be candidates to be used in the calibration mode or actual-sample analysis mode, which will be described later, as well as the information of the mass-to-charge ratios (and other properties) of the ions to be generated from each standard substance. The storage section 41 will also be used to save information of the partial mass-to-charge-ratio ranges and the normalization coefficients determined in the calibration mode or actual-sample analysis mode.

The control-and-processing unit 40 further includes, as its functional blocks, a mode selector 51, standard substance determiner 52, partial mass-to-charge-ratio range setter 53, measurement executer 54, data creator 55, normalization coefficient calculator 56, data normalizer 57 and data integrator 58. The control-and-processing unit 40 is actually a common type of personal computer, to which an input unit 6 for allowing a user to enter appropriate kinds of information and a display unit 7 for displaying appropriate kinds of information are connected. The aforementioned functional blocks are embodied by executing a previously installed mass spectrometry program on the processor in the computer.

Next, the method for mass spectrometry in the present embodiment is described.

In the method for mass spectrometry in the present embodiment, the mode selector 51 initially displays a mode selection screen on the display unit 7 to allow the user to select an analysis mode. A calibration mode and an actual-sample analysis mode are selectable as the analysis mode.

Figure 2:
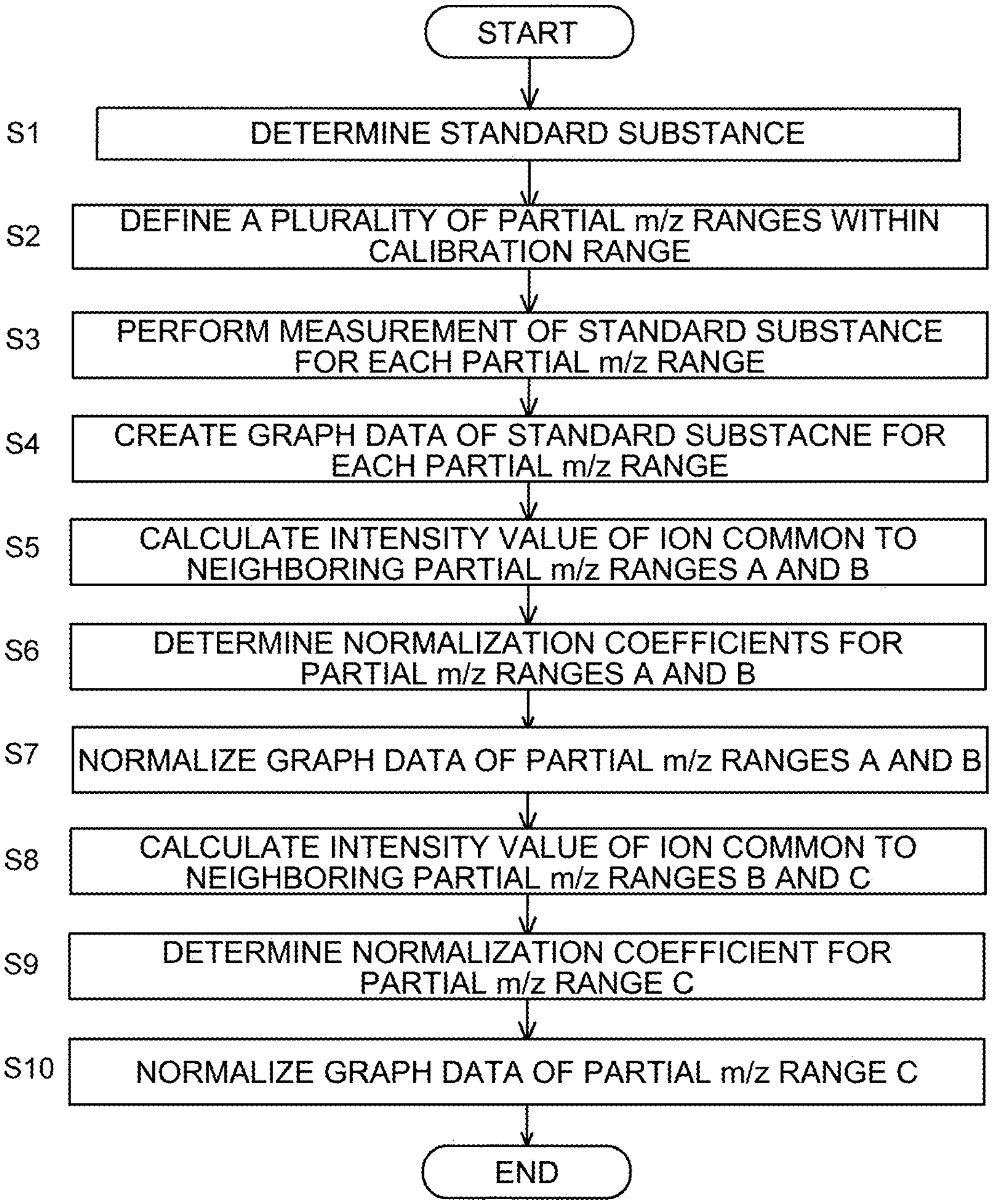
FIG. 2 is a flowchart illustrating the procedure of a calibration mode which is one embodiment of the method for mass spectrometry according to the present invention.

Hereinafter, the case where the user has selected the calibration mode is initially described. FIG. 2 is a flowchart for the calibration mode. The calibration mode is performed, for example, by the manufacturer when the liquid chromatograph mass spectrometer 1 is shipped or installed. It may also be performed by the user of the liquid chromatograph mass spectrometer 1 after a part replacement or a setting change of a section has been performed in the mass spectrometer 20, or in the process of regular maintenance. In the case where the calibration mode is performed by the user of the liquid chromatograph mass spectrometer 1, the measurement executer 54 (which will be described later) corresponds to the second measurement executer in the present invention.

When the calibration mode is initiated, the standard substance determiner 52 displays, on the display unit 7, a screen for entering information related to the standard substance, to allow the user to determine a standard substance from which a plurality of ions should be generated within the mass-to-charge-ratio range over which the calibration should be performed (Step 1). A possible method for this task is to display a list of candidates of the standard substance stored in the storage section 41, along with the information of the mass-to-charge ratios of the ions to be generated from each standard substance, and to allow the user to make a selection from the list. Another possibility is to allow the user to enter the name of the standard substance and the information of the mass-to-charge ratios of the ions to be generated from that standard substance. For example, CsI (cesium iodide) can be used as this type of standard substance. As described in Non Patent Literature 1, CsI can produce cluster ions at regular intervals of mass-to-charge ratio over a wide range of mass-to-charge ratios from 393 to over 10,000. FIG. 3 shows the mass-to-charge ratios of the ions to be generated from CsI.

A time-of-flight mass spectrometer as used in the present embodiment can perform a measurement of ions over a wide range of mass-to-charge ratios (m/z), e.g., within a range of m/z=500-20,000. However, there is a limit on the mass-to-charge-ratio range of the ions which can be accumulated within the linear ion trap 244. There is also a limit on the mass-to-charge-ratio range of the ions which can be transported by the quadrupole electrode 241. Furthermore, the memory capacity of a digitizer used for the digital conversion of the output signals of the ion detector is also limited, making it impossible to hold a huge amount of digitized data over a wide range of mass-to-charge ratios. In particular, in the multiturn time-of-flight mass separator 245 as used in the present embodiment, while the mass-resolving power can be improved by increasing the flight distance of the ions, the number of times of the sampling also increases with the flight distance, which results in an increase in data volume. For these reasons, it is impossible to simultaneously perform a measurement over a wide range of mass-to-charge ratios. Therefore, when mass spectrometry data should be acquired over a wide range of mass-to-charge ratios, the mass-to-charge-ratio range which is a measurement target is divided into a plurality of segments, and the measurement is performed for each segment of the mass-to-charge-ratio range. Ultimately, mass spectra separately obtained through the measurements are integrated.

After the standard substance has been determined, the partial mass-to-charge-ratio range setter 53 allows the user to set the mass-to-charge-ratio range over which the calibration should be performed. In the present example, the range of 500-10,800 is set as the mass-to-charge-ratio range. The partial mass-to-charge-ratio range setter 53 also displays, on the display unit 7, a screen for allowing the user to set a plurality of partial mass-to-charge-ratio ranges within the set mass-to-charge-ratio range (Step 2). The size (width) of the plurality of partial mass-to-charge-ratio ranges is determined so as to satisfy the following conditions: ions can be transported by the quadrupole electrode 241 under a single voltage-application condition; ions can be captured within the linear ion trap 244 under a single voltage-application condition; and the data volume acquired by the ion detector 247 in a single measurement should fall within a range that can be held in the digitizer. The neighboring partial mass-to-charge-ratio ranges should be partially overlapped in such a manner that the mass-to-charge ratio of an ion to be generated from the standard substance will be included in the overlapped portion.

Figure 4:
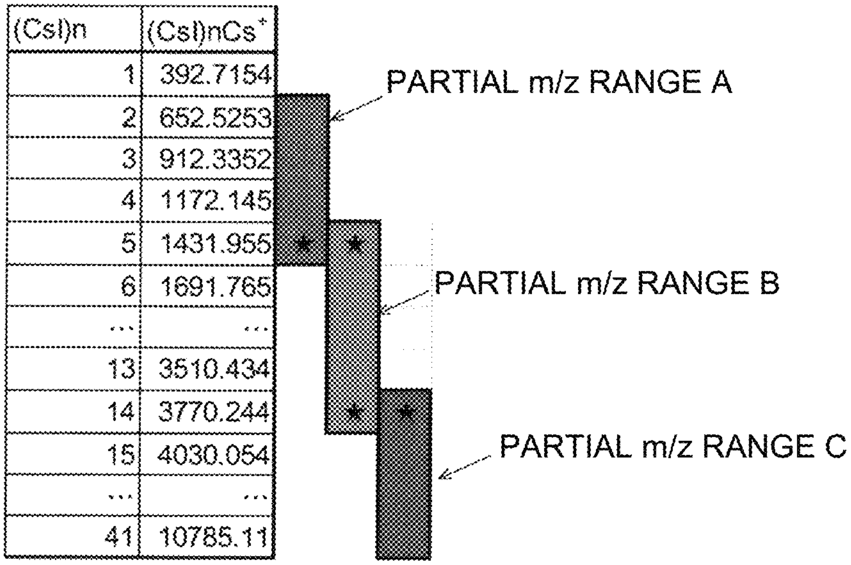
FIG. 4 is a diagram illustrating partial mass-to-charge-ratio ranges A-C in the present embodiment.

In the present example, three partial mass-to-charge-ratio ranges A-C as shown in FIG. 4 are set. The partial mass-to-charge-ratio range A is m/z=500-1,500, the partial mass-to-charge-ratio range B is m/z=1,300-3,900, and the partial mass-to-charge-ratio range C is m/z=3,600-10,800. The partial mass-to-charge-ratio ranges A and B overlap each other with a mass-to-charge-ratio range of m/z=1,300-1,500 including m/z=1,432, which is the mass-to-charge ratio of $(CsI)_5Cs^+$. The partial mass-to-charge-ratio ranges B and C overlap each other with a mass-to-charge-ratio range of m/z=3,600-3,900 including m/z=3,770, which is the mass-to-charge ratio of $(CsI)_{14}Cs^+$. The number of partial mass-to-charge-ratio ranges may also be two, or four or more.

After the partial mass-to-charge-ratio ranges have been set, the user places a standard substance in the device and issues a command to initiate the measurement. Then, the measurement executer 54 performs a measurement of the same amount of standard substance in each of the three determined partial mass-to-charge-ratio ranges A-C(Step 3). For the measurement of the standard substance, the sample may be introduced into the mass spectrometer 20 either via the liquid chromatograph 10 or directly into the ESI probe 211 of the mass spectrometer 20. In the mass spectrometer 20, for example, all ions included in the partial mass-to-charge-ratio range concerned are transported by the quadrupole electrode 241 and other related elements and temporarily captured within the liner ion trap 244, to be ejected into the drift space for the measurement. Since the period of time required for an ion to fly a predetermined distance defined within the loop-flight section 246 of the multiturn time-of-flight mass separator 245 is non-linearly related to the mass-to-charge ratio of that ion, the interval of time for sampling data during the measurement (the length of time for accumulating the intensity of the ion) does not always need to be the same in all of the plurality of partial mass-to-charge-ratio ranges: It is possible to achieve approximately equal levels of mass-resolving power for the measurement of ions in those partial mass-to-charge-ratio range even when a longer sampling interval is set in a partial mass-to-charge-ratio range with larger mass-to-charge ratios than in a partial mass-to-charge-ratio range with smaller mass-to-charge ratios.

In each of the partial mass-to-charge-ratio ranges A-C, voltages (radiofrequency voltage and/or direct voltage) suited for transporting ions included in the partial mass-to-charge-ratio range concerned are applied to the quadrupole electrode 241 and other related elements, while voltages (radiofrequency voltage and/or direct voltage) suited for capturing ions included in that partial mass-to-charge-ratio range are applied to the linear ion trap 244. That is to say, the voltage values applied to the quadrupole electrode 241 and the linear ion trap 244 during the measurement are changed for each of the partial mass-to-charge-ratio ranges A-C. Therefore, it is often the case that the measurement sensitivity is not uniform in all partial mass-to-charge-ratio ranges A-C even when the same measurement method is used for the measurement of the ions in all ranges A-C. To Address this problem, in the present embodiment, the mass spectrometry data of the partial mass-to-charge-ratio ranges A-C are normalized as follows.

After the completion of the measurement, the data creator 55 creates graph data (intensity spectrum data plotted against time of flight) for each of the partial mass-to-charge-ratio ranges A-C, with the horizontal axis indicating the time of flight and the vertical axis indicating the intensity of ions (Step 4).

Figure 5:
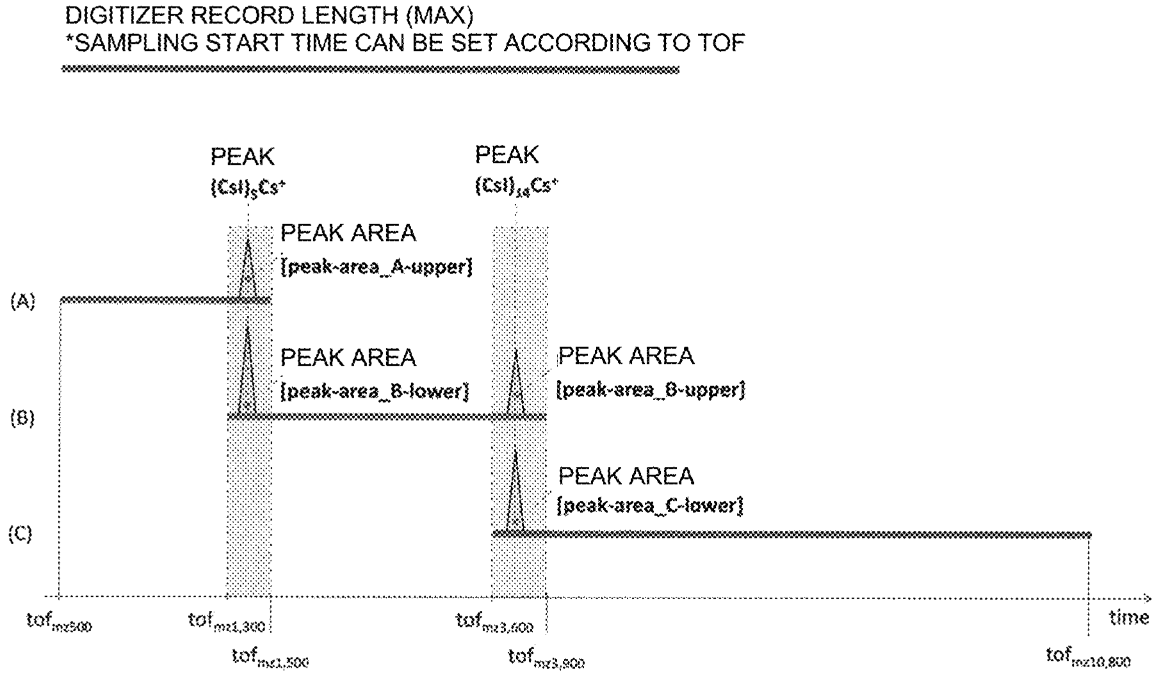
FIG. 5 is a diagram illustrating ions commonly measured in the neighboring partial mass-to-charge-ratio ranges.

Subsequently, the normalization coefficient calculator 56 calculates the intensity value of the mass peak of an ion originating from the standard substance commonly covered by the measurement in the neighboring partial mass-to-charge-ratio ranges. Specifically, from the graph data of the partial mass-to-charge-ratio ranges A and B, the intensity value for a mass peak of $(CsI)_5Cs^+$ (m/z=1,432) commonly covered by the measurement in the two mass-to-charge-ratio ranges A and B is calculated for each range (Step 5; see FIG. 5). This calculation yields a pair of intensity values: the intensity value of the mass peak of $(CsI)_5Cs^+$ (m/z=1,432) in the partial mass-to-charge-ratio range A [peak-area_A-upper] and the intensity value of the mass peak of $(CsI)_5Cs^+$ (m/z=1,432) in the partial mass-to-charge-ratio range B [peak-area_B-lower]. It should be noted that the area value of the mass peak is used as the intensity value of the mass peak in the present embodiment. The height of the mass peak could also be used as the intensity of the mass peak. However, as described earlier, the voltages applied to the related elements during the measurement are changed for each of the partial mass-to-charge-ratio ranges A-C, so that two or more peaks having equal area values may have different shapes, and consequently, different peak heights. Therefore, it is preferable to use the area value of a mass peak as the intensity value of that peak.

Figure 6:
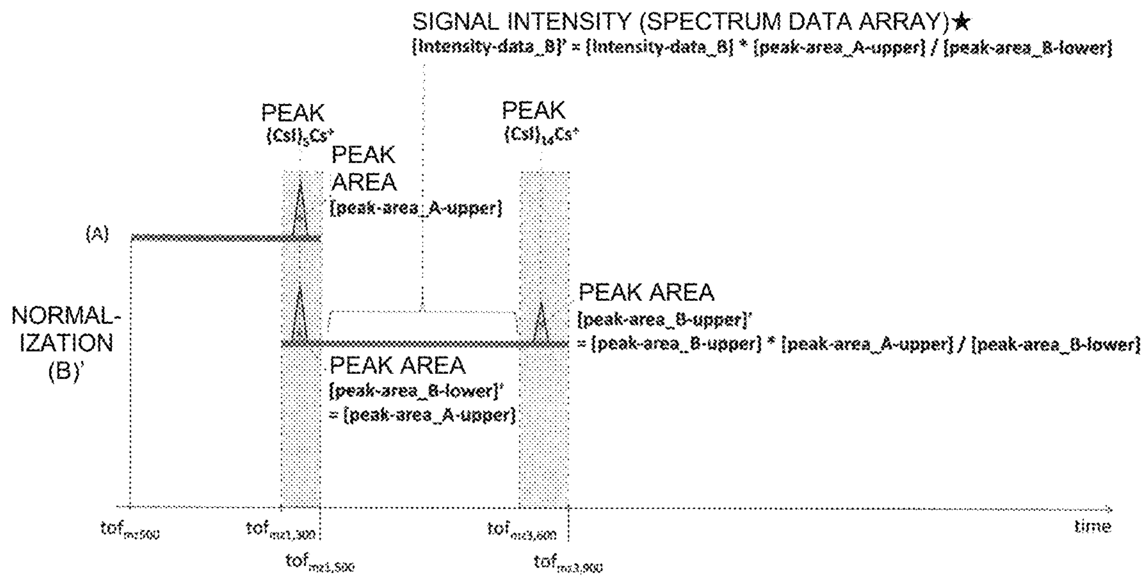
FIG. 6 is a diagram illustrating the normalization of the partial mass-to-charge-ratio range B.

The normalization coefficient calculator 56 calculates the normalization coefficients for the partial mass-to-charge-ratio ranges A and B by calculating the ratio of the aforementioned pair of intensity values (Step 6). In the present embodiment, the value of [peak-area_A-upper]/[peak-area_B-lower] is calculated as the normalization coefficient for the partial mass-to-charge-ratio range B. The normalization coefficient for the partial mass-to-charge-ratio range A used to as the reference for the normalization is defined as 1. The data normalizer 57 subsequently normalizes the graph data of the partial mass-to-charge-ratio range B by multiplying the intensity values of the graph data in the partial mass-to-charge-ratio range B by the normalization coefficient calculated for the partial mass-to-charge-ratio range B (Step 7; see FIG. 6). Thus, the measurement sensitivity is equalized between the partial mass-to-charge-ratio ranges A and B. In the present case, the partial mass-to-charge-ratio range A has been selected as the reference for determining the normalization coefficient for normalizing the partial mass-to-charge-ratio range B. A different method can also be adopted. For example, the normalization coefficients for the respective partial mass-to-charge-ratio ranges A and B may be determined in such a manner that the intensity value of the mass peak of $(CsI)_5Cs^+$ (m/z=1,432) commonly covered by the measurement in the two partial mass-to-charge-ratio range B will have a previously determined value in both ranges.

Furthermore, the normalization coefficient calculator 56 calculates the intensity of the mass peak of $(CsI)_{14}Cs^+$ (m/z=3,770) from the data of the normalized partial mass-to-charge-ratio range B and that of the partial mass-to-charge-ratio range C (Step 8). As in the previously described case, the area value of the mass peak is used as the intensity of the mass peak. This calculation yields a pair of intensity values: the intensity value of the mass peak of $(CsI)_{14}Cs^+$ (m/z=3,770) in the normalized partial mass-to-charge-ratio range B [peak-area_B-upper]' and the intensity value of the mass peak of $(CsI)_{14}Cs^+$ (m/z=3,770) in the partial mass-to-charge-ratio range C [peak-area_C-lower].

Figure 7:
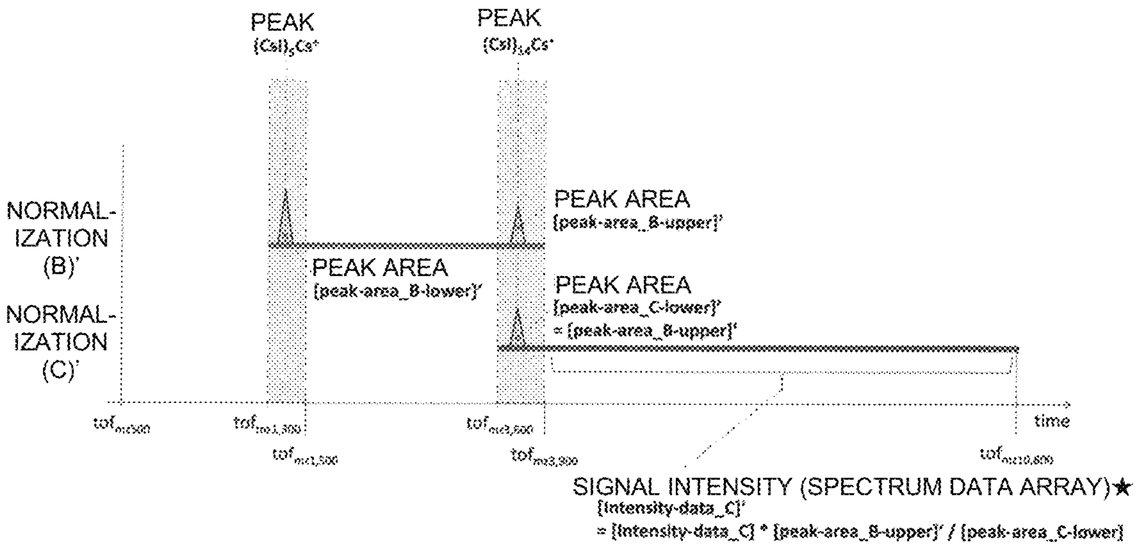
FIG. 7 is a diagram illustrating the normalization of the partial mass-to-charge-ratio range C.

The normalization coefficient calculator 56 calculates the normalization coefficient by calculating the ratio of the aforementioned pair of intensity values (Step 9). In the present embodiment, the value of [peak-area_B-upper]'/[peak-area_C-lower] is calculated as the normalization coefficient for the partial mass-to-charge-ratio range C. The data normalizer 57 subsequently normalizes the graph data of the partial mass-to-charge-ratio range C by multiplying the intensity values of the graph data in the partial mass-to-charge-ratio range C by the calculated normalization coefficient (Step 10; FIG. 7). Thus, the measurement sensitivity is equalized between the normalized partial mass-to-charge-ratio range B and the normalized partial mass-to-charge-ratio range C, and consequently, the measurement sensitivity is equalized in all partial mass-to-charge-ratio ranges A-C. In the present embodiment, since three partial mass-to-charge-ratio ranges A-C are defined, the process of calculating the normalization coefficient from the intensity ratio is performed two times. The number of times of this process depends on the number of defined partial mass-to-charge-ratio ranges. Step 10 may be omitted in the case where the required task is to merely acquire the normalization coefficient for each partial mass-to-charge ratio range in the calibration process.

The values of the normalization coefficients calculated for the partial mass-to-charge-ratio ranges A-C through the previously described processing are saved in the storage section 41 along with the mass-to-charge-ratio ranges of the respective partial mass-to-charge-ratio ranges A-C.

Figure 8:
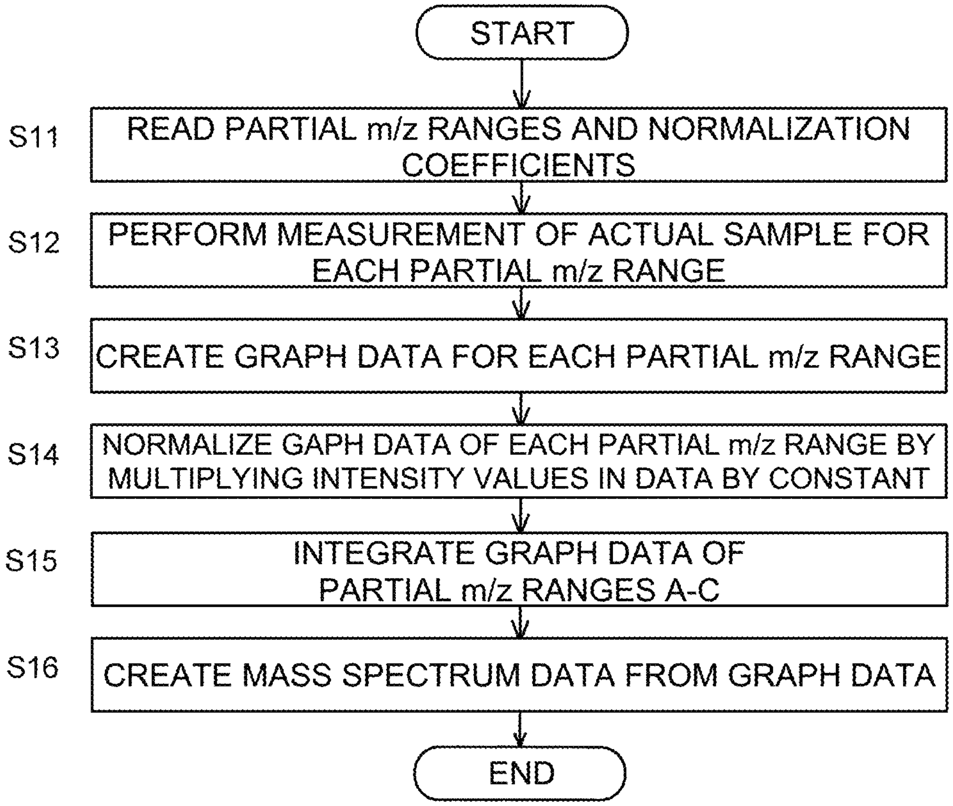
FIG. 8 is a flowchart illustrating the procedure of a measurement of an actual sample after the calibration mode has been executed in the present embodiment.

Next, the procedure for performing a measurement of an actual sample as a measurement target after the execution of the calibration mode is described with reference to the flowchart in FIG. 8.

Initially, the partial mass-to-charge-ratio range setter 53 reads the information of the target ranges and the normalization coefficients of the plurality of partial mass-to-charge-ratio ranges A-C stored in the storage section 41 (Step 11).

The user places an actual sample in the device and issues a command to initiate the measurement. Then, the measurement of the actual sample is performed in each of the read partial mass-to-charge-ratio ranges A-C(Step 12), and a set of graph data (intensity spectrum data plotted against time of flight) is created for each of the partial mass-to-charge-ratio ranges A-C, with the horizontal axis indicating the time of flight and the vertical axis indicating the intensity of ions (Step 13). In the measurement of the actual sample, for example, the sample is introduced into the liquid chromatograph (LC) 10, and the measurement over the partial mass-to-charge-ratio ranges A-C are repeatedly performed during each period of time within which one of the sample components separated by the column of the LC are being introduced (i.e., the retention time of each component).

Subsequently, for each of the partial mass-to-charge-ratio ranges A-C, the data normalizer 57 multiples the corresponding graph data by the corresponding normalization coefficient read from the storage section 41 (Step 14). The data integrator 58 integrates the normalized graph data of the partial mass-to-charge-ratio ranges A-C into one set of graph data (Step 15; see the upper portion of FIG. 9). As for the graph data in the overlapping section of the partial mass-to-charge-ratio ranges A and B, as well as the graph data in the overlapping section of the partial mass-to-charge-ratio ranges B and C, one of the two sets of overlapping data may be used for the integration, or an average of the two sets of data of the overlapping section may be used for the integration.

Figure 9:
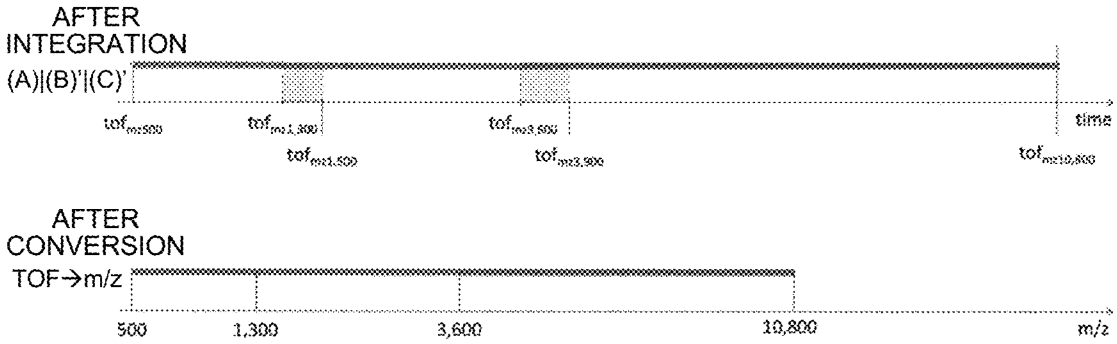
FIG. 9 is a diagram illustrating the process of creating mass spectrum data by integrating graph data of the partial mass-to-charge-ratio ranges A-C.

Ultimately, based on previously provided information (the information representing the relationship between the mass-to-charge ratio and time of flight of ions), mass spectrum data are created by converting the time of flight on the horizontal axis of the integrated graph data into the mass-to-charge ratio (Step 16; see the lower section of FIG. 9). Thus, a set of mass spectrum data having a uniform measurement sensitivity over the whole wide mass-to-charge ratio range can be obtained.

Figure 10:
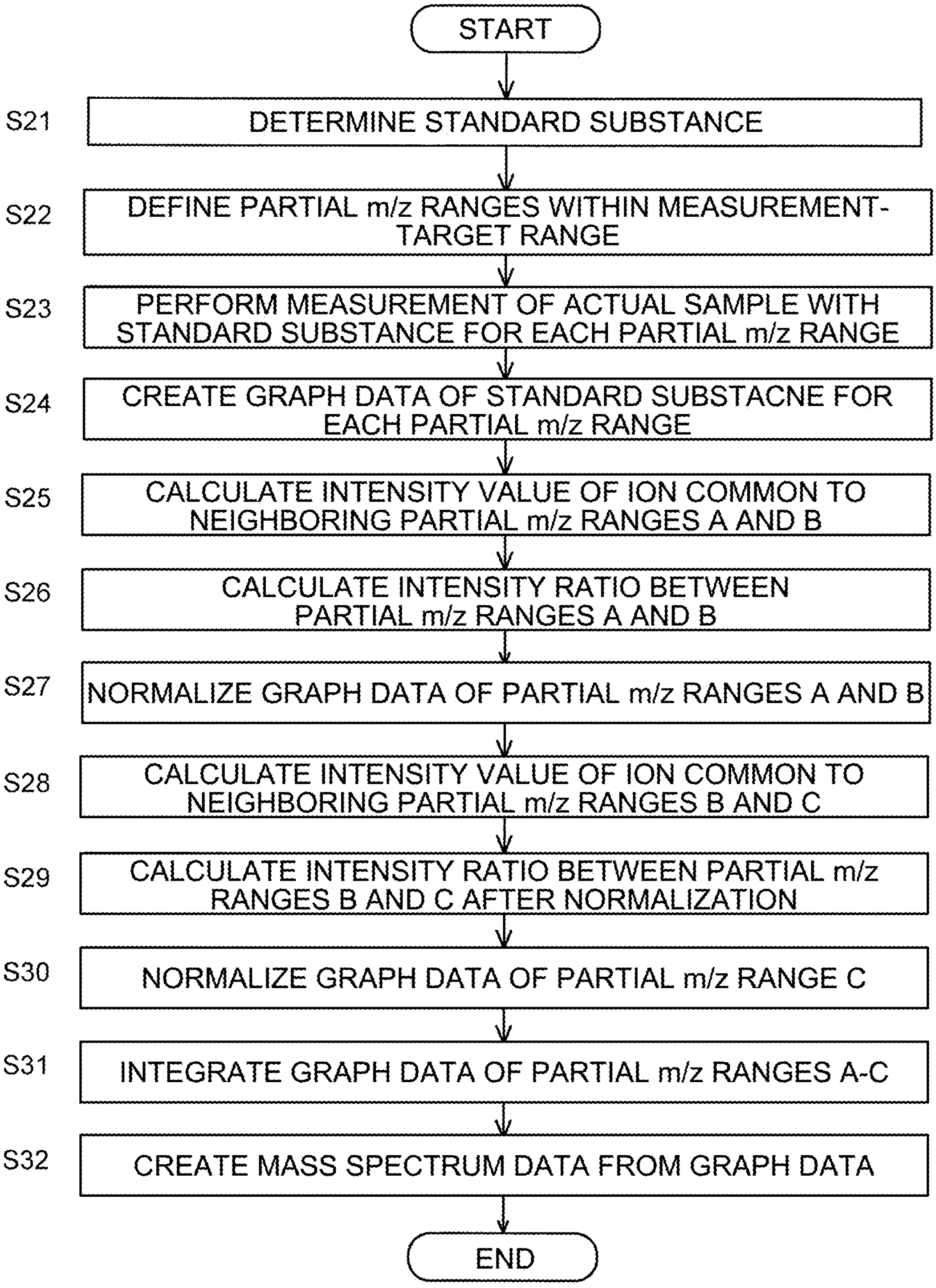
FIG. 10 is a flowchart illustrating the procedure of an actual-sample analysis mode which is one embodiment of the method for mass spectrometry according to the present invention.

Next, a case in which the user has selected the actual-sample analysis mode is described with reference to the flowchart of FIG. 10.

When the actual-sample analysis mode is initiated, the standard substance determiner 52 displays, on the display unit 7, a screen for entering information related to the standard substance, to allow the user to determine a standard substance which produces a plurality of kinds of ions within the mass-to-charge-ratio range in which the measurement of the actual sample is to be performed (Step 21). For example, as in the previously described calibration mode, CsI (cesium iodide) can be used as the standard substance. The entry of the standard substance can also be performed in a similar manner to the calibration mode.

Next, the partial mass-to-charge-ratio range setter 53 allows the user to set the mass-to-charge-ratio range within which the calibration should be performed, as well as to define a plurality of partial mass-to-charge-ratio ranges by dividing the set mass-to-charge-ratio range. As in the previous example, the range of 500-10,800 is set as the mass-to-charge-ratio range in the present example, and three partial mass-to-charge-ratio ranges A-C are set (Step 22). The requirements of the partial mass-to-charge-ratio ranges are identical to those applied in the calibration mode.

After the partial mass-to-charge-ratio ranges have been set, the user places the actual sample, with the standard substance added, in the device and issues a command to initiate the measurement. Then, the measurement executer 54 performs a measurement of the actual sample with the standard substance added in each of the three determined partial mass-to-charge-ratio ranges A-C(Step 23).

After the completion of the measurement, the data creator 55 creates a set of graph data (intensity spectrum data plotted against time of flight) for each of the partial mass-to-charge-ratio ranges A-C, with the horizontal axis indicating the time of flight and the vertical axis indicating the intensity of ions (Step 24).

Subsequently, the processes corresponding to Steps 5 through 10 in the calibration mode are performed: The normalization coefficient calculator 56 calculates the intensity value of the mass peak of an ion originating from the standard substance commonly covered by the measurement in the neighboring mass-to-charge-ratio ranges A and B (Step 25) and calculates the ratio of the intensity values in the two ranges (Step 26). The data normalizer 57 normalizes the graph data of each of the partial mass-to-charge-ratio ranges A and B by multiplying the graph data by a constant according to the calculated ratio (Step 27). Subsequently, the normalization coefficient calculator 56 calculates the intensity value of the mass peak of an ion originating from the standard substance commonly covered by the measurement in the neighboring mass-to-charge-ratio ranges B and C (Step 28) and determines the ratio of the intensity value in the normalized partial mass-to-charge-ratio range B and the intensity value in the partial mass-to-charge-ratio range C (Step 29). The data normalizer 57 normalizes the graph data of the partial mass-to-charge-ratio range C by multiplying the graph data by a constant according to the calculated ratio (Step 30).

The data integrator 58 integrates the normalized graph data of the partial mass-to-charge-ratio ranges A-C into one set of graph data (Step 31). Once again, as for the graph data of the overlapping section of the partial mass-to-charge-ratio ranges A and B, as well as the graph data of the overlapping section of the partial mass-to-charge-ratio ranges B and C, one of the two sets of overlapping data may be used for the integration, or an average of the two sets of data of the overlapping section may be used for the integration.

Ultimately, based on previously provided information (the information representing the relationship between the mass-to-charge ratio and time of flight of ions), mass spectrum data are created by converting the time of flight on the horizontal axis of the integrated graph data into the mass-to-charge ratio (Step 32). Thus, a set of mass spectrum data having a uniform measurement sensitivity over the whole wide mass-to-charge ratio range can be obtained.

The previous embodiments are mere examples and can be appropriately changed or modified without departing from the spirit of the present invention. Although the previous embodiments were concerned with a liquid chromatograph mass spectrometer 1, the previously described configuration can be similarly adopted in a gas chromatograph mass spectrometer as well as a mass spectrometer with no chromatograph. The type of ion source may be appropriately selected according to the type of sample to be analyzed. Although a linear ion trap was used in the previous embodiments in order to capture ions and simultaneously eject them into the drift space, a three-dimensional ion trap may also be used. Furthermore, a mass separator configured to cause ions to fly in a linear path or forward-return path may be used in place of the multiturn time-of-flight mass separator used in the previous embodiments. The present invention is also applicable in a mass spectrometer including a mass separator different from the time-of-flight type of device, such as a quadrupole mass filter.

The descriptions of the previous embodiments were concerned with a measurement in which ions generated from a standard substance or actual sample were directly subjected to a mass spectrometric analysis (MS analysis). The previously described processing can be similarly performed in the case where ions generated from a standard substance or actual sample and falling within each partial mass-to-charge-ratio range are introduced into the collision cell 242 and subjected to dissociation without undergoing selection, and the resulting product ions are exhaustively subjected to the measurement (MS/MS analysis). Specifically, among the ions generated from a standard substance or actual sample, ions having mass-to-charge ratios included in a previously determined mass-to-charge-ratio range are collectively selected in the quadrupole electrode 241 as precursor ions, and those precursor ions are subjected to dissociation within the collision cell 242 to generate product ions. In another possible method, an ion having a previously specified mass-to-charge ratio is selected as a precursor ion in the quadrupole electrode 241 from among the ions generated from a standard substance or actual sample, and that precursor ion is subjected to dissociation within the collision cell 242 to generate product ions. Then, as in the previous embodiments, a plurality of partial mass-to-charge-ratio ranges are set, and the product ions are captured by the linear ion trap 244 within each of those partial mass-to-charge-ratio ranges and are simultaneously ejected into the drift space, to measure the intensity of each product ion in ascending order of the time of flight.

In the case of dissociating an ion, the information of the mass-to-charge ratio of each of the one or more product ions to be generated from a precursor ion originating from the standard substance (this information corresponds to the MRM transition) should be retrieved from a compound database beforehand. Based on the intensity value of each of the mass peaks of those product ions, the mass spectrometry data of each partial mass-to-charge-ratio range are normalized. Specifically, this can be achieved by determining, as the peak area shown in FIGS. 5-7, the area value of the mass peak of a product ion (reference ion) commonly included in the neighboring partial mass-to-charge-ratio ranges and determining the normalization coefficient for each partial mass-to-charge-ratio range so that the area values in those ranges become equal to each other. In the case where the precursor ion which has not been dissociated in the collision cell 242 is detected in its original form, that precursor ion can be used as the reference ion and the intensity of its mass peak can be used as the basis for normalizing the mass spectrometry data.

In the previous embodiments, the step of selecting a standard substance is followed by the step of setting the mass-to-charge-ratio range to be covered by the measurement as well as a plurality of partial mass-to-charge-ratio ranges within that mass-to-charge-ratio range. These steps may be transposed. In which case, for example, it is preferable to compare a plurality of partial mass-to-charge-ratio ranges set by the user with the information of standard substances (the information of the mass-to-charge ratios of ions to be generated) stored in the storage section 41, and display, on the display unit 7, one or more standard substances suited for the set partial mass-to-charge-ratio ranges, or to display, on the display unit 7, a screen for prompting the user to change the setting of the partial mass-to-charge-ratio ranges when there is no standard substance suited for the set partial mass-to-charge-ratio ranges.

In the previous embodiments, the graph data with the horizontal axis indicating the time of flight and the vertical axis indicating the measured intensity in the partial mass-to-charge-ratio ranges A-C were normalized, and the time of flight was ultimately converted into the mass-to-charge ratio to create mass spectrum data. It is also possible to initially create mass spectrum data from the graph data acquired in the partial mass-to-charge-ratio ranges A-C, and subsequently normalize the mass spectrum data of each of the partial mass-to-charge-ratio ranges A-C.

In the previous embodiments, the measurement data of the partial mass-to-charge-ratio range A was used as the reference for calculating the normalization coefficient for the partial mass-to-charge-ratio range B and normalizing the measurement dada of the latter range, and furthermore, the normalized measurement data of the partial mass-to-charge-ratio range B was used as the reference for calculating the normalization coefficient for the partial mass-to-charge-ratio range C and normalizing the measurement dada of the latter range. The partial mass-to-charge-ratio range to be used as the reference may be appropriately selected. For example, in the previous embodiments, the partial mass-to-charge-ratio range B can be used as the reference for both of the partial mass-to-charge-ratio ranges A and C in the steps of calculating the normalization coefficients and normalizing the measurement data.

In the previous embodiments, only one compound (cesium iodide) was used as the standard compound. It is also possible to use a mixture of compounds as the standard substance.

MODES

It is evident for a person skilled in the art that the previously described illustrative embodiments are specific examples of the following modes of the present invention.

Clause 1

A method for mass spectrometry according to one mode of the present invention includes the steps of:

- defining a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;
- acquiring a set of mass spectrometry data by performing a mass spectrometric analysis of the known compound in each of the plurality of partial mass-to-charge-ratio ranges;
- determining a normalization coefficient for normalizing measured intensities of ions in each of the plurality of partial mass-to-charge-ratio ranges, based on the measured intensity of the reference ion in the mass spectrometry data acquired in each of the neighboring partial mass-to-charge-ratio ranges;
- acquiring a set of mass spectrometry data by performing a mass spectrometric analysis of a measurement-target sample in each of the plurality of partial mass-to-charge-ratio ranges;
- normalizing the mass spectrometry data of the measurement-target sample acquired in each of the plurality of partial mass-to-charge-ratio ranges, by multiplying the measured intensities of the ions in the mass spectrometry data by the normalization coefficient corresponding to the partial mass-to-charge-ratio range concerned; and
- integrating the normalized mass spectrometry data of the plurality of partial mass-to-charge-ratio ranges into one set of mass spectrometry data.

Clause 2

A method for mass spectrometry according to another mode of the present invention includes the steps of:

defining a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;

acquiring a set of mass spectrometry data by performing a mass spectrometric analysis of a measurement-target sample with the known compound added in each of the plurality of partial mass-to-charge-ratio ranges;

normalizing the mass spectrometry data of the measurement-target sample acquired in each of the plurality of partial mass-to-charge-ratio ranges, in such a manner that measured intensities of the reference ion in the sets of mass spectrometry data respectively acquired in the neighboring partial mass-to-charge-ratio ranges are equalized; and integrating the normalized mass spectrometry data of the plurality of partial mass-to-charge-ratio ranges into one set of mass spectrometry data.

Clause 4

A mass spectrometer according to one mode of the present invention includes:

a storage section in which a plurality of partial mass-to-charge-ratio ranges defined by dividing a whole mass-to-charge-ratio range which is a measurement target and a normalization coefficient in each of the plurality of partial mass-to-charge-ratio ranges are stored, where the plurality of partial mass-to-charge-ratio ranges are defined in such a manner that neighboring partial mass-to-charge-ratio ranges overlap each other at the mass-to-charge ratio of a predetermined reference ion generated from a known compound, while the normalization coefficient is determined based on the measured intensity of the reference ion in the mass spectrometry data acquired in each of the neighboring partial mass-to-charge-ratio ranges;

a measurement executer configured to acquire a set of mass spectrometry data by performing a mass spectrometric analysis of a measurement-target sample in each of the plurality of partial mass-to-charge-ratio ranges;

a data normalizer configured to normalize the mass spectrometry data of the measurement-target sample acquired in each of the plurality of partial mass-to-charge-ratio ranges, by multiplying measured intensities of ions in the mass spectrometry data by the normalization coefficient corresponding to the partial mass-to-charge-ratio range concerned; and a data integrator configured to integrate the normalized mass spectrometry data of the plurality of partial mass-to-charge-ratio ranges into one set of mass spectrometry data.

Clause 6

A mass spectrometer according to another mode of the present invention includes:

a partial mass-to-charge-ratio range setter configured to define a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;

a measurement executer configured to acquire a set of mass spectrometry data by performing a mass spectrometric analysis of a measurement-target sample with the known compound added in each of the plurality of partial mass-to-charge-ratio ranges;

a data normalizer configured to normalize the mass spectrometry data of the measurement-target sample acquired in each of the plurality of partial mass-to-charge-ratio ranges, in such a manner that measured intensities of the reference ion in the sets of mass spectrometry data respectively acquired in the neighboring partial mass-to-charge-ratio ranges are equalized; and a data integrator configured to integrate the normalized mass spectrometry data of the plurality of partial mass-to-charge-ratio ranges into one set of mass spectrometry data.

In the methods for mass spectrometry according to Clauses 1 and 2 as well as the mass spectrometers according to Clauses 4 and 6, a plurality of partial mass-to-charge-ratio ranges are defined by dividing a whole mass-to-charge-ratio range which is a measurement target, in such a manner that neighboring partial mass-to-charge-ratio ranges overlap each other at the mass-to-charge ratio of a predetermined reference ion generated from a known compound. In the case where the mass spectrometric analysis to be executed is an MS analysis, the reference ion is an ion directly generated from the known compound. In the case of an MS/MS analysis, the reference ion is either an ion generated from the known compound, or an ion (product ion) generated by the dissociation of the aforementioned ion (precursor ion). When the number of partial mass-to-charge-ratio ranges is n, the number of reference ions is n-1 (where n is a positive integer). Accordingly, when the number of partial mass-to-charge-ratio ranges is two, only one reference ion will used, whereas a plurality of reference ions will be used when the number of partial mass-to-charge-ratio ranges is three or more. In each of the plurality of partial mass-to-charge ratios, a mass spectrometric analysis of the known compound or a measurement-target sample with the known compound added is performed to acquire a set of mass spectrometry data.

After the sets of mass spectrometry data corresponding to the partial mass-to-charge-ratio ranges have been acquired, a normalization coefficient is determined for each of the plurality of partial mass-to-charge-ratio ranges, based on the measured intensities of the reference ion in the neighboring partial mass-to-charge-ratio ranges. In the methods for mass spectrometry according to Clauses 1 and 2 as well as the mass spectrometers according to Clauses 4 and 6, the sets of mass spectrometry data acquired for the plurality of partial mass-to-charge-ratio ranges are normalized so that the measured intensities of the reference ion commonly measured in the neighboring partial mass-to-charge-ratio ranges will be equalized, and the measurement sensitivity for the ions will be equalized. Therefore, a set of mass spectrometry data having a uniform measurement sensitivity over the whole mass-to-charge-ratio range which is a measurement target can be obtained by integrating the normalized mass spectrometry data corresponding to the plurality of partial mass-to-charge-ratio ranges.

Clause 3

In the method for mass spectrometry according to Clause 3, which is one mode of the method for mass spectrometry according to Clause 1 or 2, either the mass spectrometry data of one of the partial mass-to-charge-ratio ranges or average data of the mass spectrometry data of two neighboring partial mass-to-charge-ratio ranges is used as the mass spectrometry data corresponding to an overlapping section of the partial mass-to-charge-ratio ranges in the step of integrating the normalized mass spectrometry data.

In the method for mass spectrometry according to Clauses 1 or 2, the step of integrating the normalized mass spectrometry data into one set can be performed by using, as mass spectrometry data corresponding to the overlapping section of the partial mass-to-charge-ratio ranges, either the mass spectrometry data of one of the partial mass-to-charge-ratio ranges or average data of the mass spectrometry data of two neighboring partial mass-to-charge-ratio ranges.

Clause 5

The mass spectrometer according to Clause 5 is one mode of the mass spectrometer according to Clause 4 and further includes:

a partial mass-to-charge-ratio range setter configured to define a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;

a second measurement executer configured to acquire mass spectrometry data by performing a mass spectrometric analysis of the known compound in each of the plurality of partial mass-to-charge-ratio ranges; and a normalization coefficient determiner configured to determine a normalization coefficient for normalizing measured intensities of ions in each of the plurality of partial mass-to-charge-ratio ranges, based on a measured intensity of the reference ion in the mass spectrometry data acquired in each of the neighboring partial mass-to-charge-ratio ranges, and to save, in the storage section, the plurality of partial mass-to-charge-ratio ranges as well as the normalization coefficient in each of the plurality of partial mass-to-charge-ratio ranges.

The mass spectrometer according to Clause 5 allows users to originally determine a plurality of partial mass-to-charge-ratio ranges and normalization coefficients apart from the partial mass-to-charge-ratio ranges and normalization coefficients previously saved in the storage section at the time of the shipment of the device.

Clause 7

The mass spectrometer according to Clause 7 is one mode of the mass spectrometer according to one of Clauses 4-6 and further includes a time-of-flight mass separator configured to cause ions which are measurement targets to fly in a predetermined flight space.

In a configuration including a time-of-flight mass separator, like the mass spectrometer according to Clause 7, a measurement of ions can be performed over a wide range of mass-to-charge ratios (m/z), e.g., within a range of m/z=500-20,000. However, there is a limit on the mass-to-charge-ratio range of the ions which can be accumulated within an ion trap. There is also a limit on the mass-to-charge-ratio range of the ions which can be transported by a quadrupole electrode. Furthermore, the memory capacity of a digitizer used for the digital conversion of the output signals of the ion detector is also limited, making it impossible to hold a huge amount of digitized data over a wide range of mass-to-charge ratios. In particular, in a mass spectrometer having a multiturn time-of-flight mass separator, which has the characteristic that its mass-resolving power can be improved by increasing the time of flight of the ions and decreasing the sampling interval of the data, the amount of data tends to be huge. The mass spectrometer according to one of Clauses 4-6 is particularly suited for use in the case of a device having a configuration including a time-of-flight mass separator, like the mass spectrometer according to Clause 7.

REFERENCE SIGNS LIST

1 . . . Liquid Chromatograph Mass Spectrometer
10 . . . Liquid Chromatograph
20 . . . Mass Spectrometer
21 . . . Ionization Chamber
211 . . . ESI Probe
212 . . . Desolvation Tube
22 . . . First Intermediate Vacuum Chamber
221 . . . Ion Guide
222 . . . Skimmer Cone
23 . . . Second Intermediate Vacuum Chamber
231 . . . Ion Guide
24 . . . Analysis Chamber
241 . . . Quadrupole Electrode
242 . . . Collision Cell
243 . . . Multipole Ion Guide
244 . . . Linear Ion Trap
2441 . . . Front-Side Electrode
2442 . . . Back-Side Electrode
2443 . . . Rod Electrode
2444 . . . Slit
245 . . . Multiturn Time-of-Flight Mass Separator
2451 . . . Ion Introduction Port
2452 . . . Ion Ejection Port
246 . . . Loop-Flight Section
2461 . . . Outer Electrode
2462 . . . Inner Electrode
247 . . . Ion Detector
40 . . . Control-and-Processing Unit
41 . . . Storage Section
51 . . . Mode Selector
52 . . . Standard Substance Determiner
53 . . . Partial Mass-to-Charge-Ratio Range Setter
54 . . . Measurement Executer
55 . . . Data Creator
56 . . . Normalization Coefficient Calculator
57 . . . Data Normalizer
58 . . . Data Integrator
6 . . . Input Unit
7 . . . Display Unit

The invention claimed is:

1. A method for mass spectrometry, comprising steps of:

defining a plurality of partial mass-to-charge-ratio ranges by dividing a whole mass-to-charge-ratio range which is a measurement target, in such a manner that neighboring partial mass-to-charge-ratio ranges overlap each other at a mass-to-charge ratio of a predetermined reference ion generated from a known compound;

acquiring a set of mass spectrometry data by performing a mass spectrometric analysis of the known compound in each of the plurality of partial mass-to-charge-ratio ranges;

determining a normalization coefficient for normalizing measured intensities of ions in each of the plurality of partial mass-to-charge-ratio ranges, based on a measured intensity of the reference ion in the mass spectrometry data acquired in each of the neighboring partial mass-to-charge-ratio ranges;

acquiring a set of mass spectrometry data by performing a mass spectrometric analysis of a measurement-target sample in each of the plurality of partial mass-to-charge-ratio ranges;

normalizing the mass spectrometry data of the measurement-target sample acquired in each of the plurality of partial mass-to-charge-ratio ranges, by multiplying the measured intensities of the ions in the mass spectrometry data by the normalization coefficient corresponding to the partial mass-to-charge-ratio range concerned; and integrating the normalized mass spectrometry data of the plurality of partial mass-to-charge-ratio ranges into one set of mass spectrometry data.

2. The method for mass spectrometry according to claim 1, wherein either the mass spectrometry data of one of the partial mass-to-charge-ratio ranges or average data of the mass spectrometry data of two neighboring partial mass-to-charge-ratio ranges is used as the mass spectrometry data corresponding to an overlapping section of the partial mass-to-charge-ratio ranges in the step of integrating the normalized mass spectrometry data.

3. A method for mass spectrometry, comprising steps of:

defining a plurality of partial mass-to-charge-ratio ranges by dividing a whole mass-to-charge-ratio range which is a measurement target, in such a manner that neighboring partial mass-to-charge-ratio ranges overlap each other at a mass-to-charge ratio of a predetermined reference ion generated from a known compound;

acquiring a set of mass spectrometry data by performing a mass spectrometric analysis of a measurement-target sample with the known compound added in each of the plurality of partial mass-to-charge-ratio ranges;

normalizing the mass spectrometry data of the measurement-target sample acquired in each of the plurality of partial mass-to-charge-ratio ranges, in such a manner that measured intensities of the reference ion in the sets of mass spectrometry data respectively acquired in the neighboring partial mass-to-charge-ratio ranges are equalized; and integrating the normalized mass spectrometry data of the plurality of partial mass-to-charge-ratio ranges into one set of mass spectrometry data.

4. The method for mass spectrometry according to claim 3, wherein either the mass spectrometry data of one of the partial mass-to-charge-ratio ranges or average data of the mass spectrometry data of two neighboring partial mass-to-charge-ratio ranges is used as the mass spectrometry data corresponding to an overlapping section of the partial mass-to-charge-ratio ranges in the step of integrating the normalized mass spectrometry data.

5. A mass spectrometer, comprising:

a storage section in which a plurality of partial mass-to-charge-ratio ranges defined by dividing a whole mass-to-charge-ratio range which is a measurement target and a normalization coefficient in each of the plurality of partial mass-to-charge-ratio ranges are stored, where the plurality of partial mass-to-charge-ratio ranges are defined in such a manner that neighboring partial mass-to-charge-ratio ranges overlap each other at a mass-to-charge ratio of a predetermined reference ion generated from a known compound, while the normalization coefficient is determined based on a measured intensity of the reference ion in the mass spectrometry data acquired in each of the neighboring partial mass-to-charge-ratio ranges;

a measurement executer configured to acquire a set of mass spectrometry data by performing a mass spectrometric analysis of a measurement-target sample in each of the plurality of partial mass-to-charge-ratio ranges;

a data normalizer configured to normalize the mass spectrometry data of the measurement-target sample acquired in each of the plurality of partial mass-to-charge-ratio ranges, by multiplying measured intensities of ions in the mass spectrometry data by the normalization coefficient corresponding to the partial mass-to-charge-ratio range concerned; and a data integrator configured to integrate the normalized mass spectrometry data of the plurality of partial mass-to-charge-ratio ranges into one set of mass spectrometry data.

6. The mass spectrometer according to claim 5, further comprising:

a partial mass-to-charge-ratio range setter configured to define a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;

a second measurement executer configured to acquire mass spectrometry data by performing a mass spectrometric analysis of the known compound in each of the plurality of partial mass-to-charge-ratio ranges; and a normalization coefficient determiner configured to determine a normalization coefficient for normalizing measured intensities of ions in each of the plurality of partial mass-to-charge-ratio ranges, based on a measured intensity of the reference ion in the mass spectrometry data acquired in each of the neighboring partial mass-to-charge-ratio ranges, and to save, in the storage section, the plurality of partial mass-to-charge-ratio ranges as well as the normalization coefficient in each of the plurality of partial mass-to-charge-ratio ranges.

7. The mass spectrometer according to claim 5, further comprising a time-of-flight mass separator configured to cause ions which are measurement targets to fly in a predetermined flight space.

8. A mass spectrometer, comprising:

a partial mass-to-charge-ratio range setter configured to define a plurality of partial mass-to-charge-ratio ranges by dividing a whole mass-to-charge-ratio range which is a measurement target, in such a manner that neighboring partial mass-to-charge-ratio ranges overlap each other at the mass-to-charge ratio of a predetermined reference ion generated from a known compound;

a measurement executer configured to acquire a set of mass spectrometry data by performing a mass spectrometric analysis of a measurement-target sample with the known compound added in each of the plurality of partial mass-to-charge-ratio ranges;

a data normalizer configured to normalize the mass spectrometry data of the measurement-target sample acquired in each of the plurality of partial mass-to-charge-ratio ranges, in such a manner that measured intensities of the reference ion in the sets of mass spectrometry data respectively acquired in the neighboring partial mass-to-charge-ratio ranges are equalized; and a data integrator configured to integrate the normalized mass spectrometry data of the plurality of partial mass-to-charge-ratio ranges into one set of mass spectrometry data.

9. The mass spectrometer according to claim 8, further comprising a time-of-flight mass separator configured to cause ions which are measurement targets to fly in a predetermined flight space.

* * * * *